United States Patent Office 3,375,252
Patented Mar. 26, 1968

3,375,252
PROCESS FOR THE PRODUCTION OF 2-METHYL-1,4-DIAZA-BICYCLO-(2,2,2)-OCTANE
Shiyunichi Yamada and Toshinori Kurano, Kanagawa-ken, Japan, assignors to Sankyo Chemical Industries Ltd., Tokyo, Japan, a corporation of Japan
No Drawing. Filed June 28, 1966, Ser. No. 561,030
Claims priority, application Japan, July 1, 1965, 40/38,952
2 Claims. (Cl. 260—268)

ABSTRACT OF THE DISCLOSURE

New and improved process for the preparation of 2-methyl-1,4-diaza-bicyclo-(2,2,2)-octane which comprises heating 2-methyl-1,4-di-beta-hydroxyethyl piperazine or 1,4-di-beta-hydroxypropyl piperazine in the presence of an alkali or alkaline earth metal salt of acetic acid.

---

This invention relates to a process for the production of 2-methyl-1,4-diaza-bicyclo-(2,2,2)-octane which is referred to as "methyl triethylene diamine" hereinafter. More particularly, this invention relates to the improvement in the production of 2-methyl-1,4-diaza-bicyclo-(2,2,2)-octane.

Methyl triethylene diamine has a wide variety of applications in industry. For instance, this compound is useful as a urethane polymerization catalyst.

In the prior art for the production of methyl triethylene diamine, it has been known heretofore to effect heating of N,N'-di-$\beta$-hydroxyethylpiperazine with a carboxylic acid at a temperature of 250° to 350° C. (cf. Japanese patent specification No. 425,426). However, such prior method is not technically advantageous because of its poor yield of desired product.

As the result of our extensive researches, we have now found that methyl triethylene diamine can be obtained in good yield by heating N,N'-di-$\beta$-hydroxyethylpiperazine together with the alkali metal or alkaline earth metal salt of a carboxylic acid.

According to the present invention, methyl triethylene diamine is produced by heating a compound of the general formula

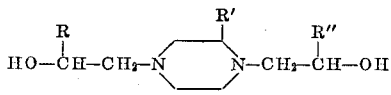

(wherein R, R' and R'' individually mean hydrogen or methyl radical, provided that when R' is hydrogen, both R and R'' are methyl and when R' is methyl, both R and R'' are hydrogen) together with the alkali metal or alkaline earth metal salt of a saturated carboxylic acid. The term, "a saturated carboxylic acid," used herein is to be understood to include saturated aliphatic carboxylic acids, saturated aralipathic carboxylic acids and aryloxy-saturated aliphatic carboxylic acids.

Suitable as the alkali metal or alkaline earth metal salt of a saturated carboxylic acid are included the sodium, potassium, calcium, magnesium and barium salts of acetic acid, propionic acid, n-butyric acid, caproic acid, n-octanoic acid, pelargoic acid, lauric acid, phenylacetic acid and phenoxyacetic acid. These salts are preferably used in the amount of 0.05–50 parts by weight per 100 parts of the starting material used. However, it is to be noted that the above-specified range is not critical. Heating usually is made at a temperature of 250°–350° C., but this temperature range also is not critical.

The intended conversion can be conveniently carried out under an ordinary pressure. It is, however, possible to carry out the reaction under a slightly reduced pressure or under an inert gas atmosphere, e.g. nitrogen or argon, in order to facilitate the recovery of desired product from the reaction system.

Crude methyl triethylene diamine as recovered (including some low-boiling materials) can be purified in the manner known per se, as by fractional distillation.

Suitable starting materials which are defined by the above-indicated general formula include 2-methyl-1,4-di-$\beta$-hydroxyethylpiperazine (called methyl piperazine diethanol hereinafter) and 1,4-di-$\beta$-hydroxypropylpiperazine (called piperazine diisopropanol hereinafter). Both of these two compounds are known in the art, and the former compound is obtained by the reaction of 2-methylpiperazine with ethylene oxide and the latter obtained by the reaction of piperazine with propylene oxide, or more economically by the condensation of monoisopropanol amine with ethylene dihalide.

Now the following examples will be given to show the present invention in detail.

Example 1

In a reaction vessel with a stirrer and an outlet for uptake of distillate, 100 parts of methyl piperazine diethanol and 25 parts of dry sodium acetate are placed. While a nitrogen gas is slowly passed into the vessel, heating is made at 250° to 320° C. During about 20 hours, 80 parts of the liquid distillate are obtained, which is then refined to recover 34 parts of a fraction boiling at 182–186° C. This fraction is a pale yellow liquid which is identified as methyl triethylene diamine (yield 50.7%). It can be converted into its di-p-nitrophenolate by a usual method. The elementary analysis of this material for $C_7H_{14}N_2 \cdot 2C_6H_5NO_3$ is as follows:

Found: C, 56.37%; H, 6.17%; N, 13.70%. Calcd.: C, 56.43%; H, 5.98%; N, 13.86%.

The above procedures are repeated but using the indicated amount of the alkali metal or alkaline earth metal salt of a saturated carboxylic acid instead of 25 g. of the sodium acetate used. The results of individual runs are set forth below.

| Methyl-piperazine diethanol, parts | Salt of saturated carboxylic acid | Methyl triethylene diamine, parts |
|---|---|---|
| 100 | Potassium acetate 30 parts | 32.0 |
| 100 | Magnesium acetate 20 parts | 31.5 |
| 100 | Calcium acetate 20 parts | 34.0 |
| 56.5 | Sodium propionate 15 parts | 17.0 |
| 56.5 | Potassium propionate 10.5 parts | 16.0 |
| 56.5 | Magnesium propionate 10.5 parts | 10.0 |
| 47.0 | Sodium caproate 5.0 parts | 10.2 |
| 47.0 | Sodium laurate 10.0 parts | 8.5 |
| 47.0 | Sodium phenylacetate 5.6 parts | 8.0 |
| 47.0 | Sodium phenoxyacetate 10.0 parts | 6.0 |

Example 2

A mixture of 108 parts of piperazine diisopropanol and 27 parts of potassium propionate is treated in the same manner as in Example 1. 26 parts of methyl triethylene diamine is obtained. Yield 38.6%. The corresponding di-p-nitrophenolate has the following elementary analysis:

Calcd.: C, 56.43%; H, 6.00%; N, 13.85%.

IR-absorption spectrum of this di-p-nitrophenolate is found to be quite identical with that of methyl triethylene diamine di-p-nitrophenolate.

The above procedures are repeated but using the indicated amount of an other alkali metal or alkaline earth metal salt of a saturated carboxylic acid instead of 27 parts of the potassium propionate as used above. The results of individual runs are set forth below:

| Piperazine diisopropanol, parts | Salts of saturated carboxylic acid | Methyl triethylene diamine, parts |
|---|---|---|
| 108 | Sodium acetate 25 parts | 25.0 |
| 108 | Potassium acetate 25 parts | 26.0 |
| 40.4 | Sodium phenoxyacetate 10.0 parts | 4.0 |

*Example 3*

A mixture of 50 parts of methyl piperazine diethanol and 10 parts of calcium acetate monohydrate is treated in the same manner as in Example 1. 11.7 parts of methyl triethylene diamine is obtained. Yield 35%.

*Example 4*

(a) 50 parts of 2-methyl piperazine is dissolved in 80 parts of benzene. To the resulting solution, 49 parts of ethylene oxide is introduced at an ordinary temperature. Then, the temperature is gradually raised to 60° C. at which the reaction mixture is kept for 4 hours. Under an ordinary pressure, the benzene is recovered by distillation. At an internal temperature of 150° C., evacuation is applied to remove the remaining benzene completely. The resulting residue is about 100 parts of crude methyl piperazine diethanol which can be distilled in vacuo (3.5 mm. Hg) to obtain 89 parts of a fraction boiling at 162°–165° C.

(b) About 100 g. of the crude methyl piperazine diethanol as obtained in (a) is added with 15 parts of sodium acetate. The mixture is then treated in the same manner as in Example 1, thereby to obtain totally 50 parts of a fraction boiling at 130°–200° C. This fraction is dissolved in 100 parts of water. A water-immiscible oily portion is removed by means of a separation funnel. The remaining aqueous portion is decolorized with 2 g. of active carbon. To this aqueous portion while cold, 40 parts of sodium hydroxide is added. By agitation, some oil is separated. This is extracted with 200 parts of benzene. The aqueous layer is further extracted with 50 parts of benzene. The extracts are combined and the benzene is removed under an ordinary pressure, while leaving an oily material. This is distilled under a reduced pressure thereby to obtain 37.8 parts of methyl triethylene diamine (B.P. 92–99° C.). Yield 60% (based on the methyl piperazine). Purity 98% or more.

What we claim is:

1. A process for the preparation of 2-methyl-1,4-diazabicyclo-(2,2,2)-octane which comprises heating a compound having the formula:

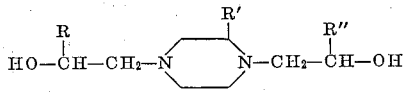

(wherein R, R' and R'' individually mean hydrogen atom or methyl group, provided that, where R' is methyl, both R and R'' are hydrogens and, where R' is hydrogen, both R and R'' are methyl groups) in the presence of an alkali metal or alkaline earth metal salt of acetic acid.

2. A process according to claim 1, wherein the said salt is a member of the group consisting of sodium, potassium, calcium and magnesium salt.

References Cited

FOREIGN PATENTS 906,861   9/1962   Great Britain.

HENRY R. JILES, *Primary Examiner.*